United States Patent [19]
Kazecki et al.

[11] Patent Number: 5,488,638
[45] Date of Patent: Jan. 30, 1996

[54] CLOCK RECOVERY METHOD AND APPARATUS IN A DIVERSITY RECEIVER

[75] Inventors: Henry L. Kazecki, Arlington Heights; John W. Diehl, Glen Ellyn, both of Ill.

[73] Assignee: Motorola, Inc., Schaumburg, Ill.

[21] Appl. No.: 198,662

[22] Filed: Feb. 22, 1994

Related U.S. Application Data

[63] Continuation of Ser. No. 844,084, Mar. 2, 1992, abandoned.

[51] Int. Cl.[6] ................................. H04B 7/10; H04L 1/02
[52] U.S. Cl. ...................... 375/347; 375/365; 455/133
[58] Field of Search ..................... 375/100, 40, 96, 375/114, 116, 113, 347, 350, 364, 366, 368, 267, 350, 343, 365, 355; 370/93, 95.3, 105.3; 455/132, 133, 134, 135

[56] References Cited

U.S. PATENT DOCUMENTS

| | | | |
|---|---|---|---|
| 3,783,385 | 1/1974 | Dunn et al. | 375/83 |
| 3,975,687 | 8/1976 | Tan et al. | 455/133 |
| 4,015,205 | 3/1977 | Ikeda et al. | 375/100 |
| 4,035,728 | 7/1977 | Ishikawa et al. | 455/132 |
| 4,704,734 | 11/1987 | Menich et al. | 455/134 X |
| 5,031,193 | 7/1991 | Atkinson et al. | 375/100 |
| 5,103,459 | 4/1992 | Gilhousen et al. | 375/68 X |

OTHER PUBLICATIONS

*Evaluation of Diversity Schemes in TDMA Digital Mobile Radio*, Globecom '90, IEEE Global Telecommunications Conference, 1990, vol. 1, pp. 490–494.

Primary Examiner—Stephen Chin
Assistant Examiner—Tesfaldet Bocure
Attorney, Agent, or Firm—Richard A. Sonnentag; Anthony G. Sitko

[57] ABSTRACT

A diversity receiver (200) recovers clock information from different versions (301, 302) of a transmitted signal (106). The diversity receiver (200) receives the different versions (301, 302), converts the versions (301, 302) into samples (307, 317) via a common sampling clock (309). The receiver (200) then correlates the samples (307, 317) with like synchronization patterns and uses clock information from the received version (307 or 317) which gives the greatest correlation output signal (504, 506) for data detection in one of two detectors (323, 326). The choice of detectors (323, 326) is determined by the diversity receiver (200) by counting the total number of bit-differences output by detectors (323, 326) over a predetermined time period and comparing the total bit-differences with a number represented by a threshold signal (330).

19 Claims, 5 Drawing Sheets

CLOCK RECOVERY METHOD AND APPARATUS IN A DIVERSITY RECEIVER

This is a continuation of application Ser. No. 07/844,084, filed Mar. 2, 1992 and now abandoned.

FIELD OF THE INVENTION

This invention relates generally to receivers in communication systems and more particularly to diversity receivers in radiotelephone systems.

BACKGROUND OF THE INVENTION

In TDM digital transmission systems, synchronization and clock recovery are facilitated by some form of correlation on a synchronization word. If the received synchronization word is corrupted in any way (e.g., Rayleigh fading), clock recovery may be sub-optimal, and the resulting bit-error rate (BER) subsequently degraded. For a background on Rayleigh fading, reference is made to George Calhoun, DIGITAL CELLULAR RADIO, published in 1988 in the United States of America. For the case when the synchronization word is severely corrupted (e.g., a fading null occurs in the middle of the synchronization word), the entire data within that timeslot may be lost. In a diversity receiver, the recovered clock in one branch can be corrupted to cause a degraded overall received signal in the diversity combining algorithm. In digital cellular systems, these problems make it difficult to achieve a $10^{31\ 6}$ BER at high signal levels in Rayleigh faded environment.

The difficulty to achieve $10^{31\ 6}$ BER at high signal levels makes it difficult to choose data detectors to be used within the diversity receiver. For example, a maximum ratio (max-ratio) diversity coherent detector offers performance improvements over a single branch coherent detector, especially at low signal levels. For strong RF signals however (i.e., greater than –95 dBm), the max-ratio detector exhibits a BER "floor" of $1 \times 10^{31\ 5}$ in a Rayleigh faded environment. The $10^{31\ 6}$ can be met using a selection diversity delay detector, but performance at low RF signal levels is compromised. For BER between $2 \times 10^{31\ 4}$ and $2 \times 10^{31\ 5}$ (for radio with a noise Figure of 8 dB, this approximately corresponds to RF signal levels between –92 dBm and –98 dBm), the max-ratio coherent detector and the selection diversity delay detector yield similar results. Conventional detector selection methods based on received signal strength indication (RSSI) could be used, but would require having a balanced RSSI measurement between the two diversity branches which is difficult to achieve in the receiver design. Use of a detector eliminates the need for the use of signal strength from the radio which in turn makes the radio insensitive to errors in RF signal level measurements. If only RF signal strength measurements were used, a small error in RF signal level would result in a significant BER degradation due to the significant relationship between the BER and the RF signal level.

Thus, a need exists for a diversity receiver which employs improved clock recovery and/or detector selection algorithm for use in data recovery which meets, inter alia, demanding receiver performance specifications.

SUMMARY OF THE INVENTION

A radiotelephone receives a plurality of different versions of a signal transmitted from a source, the plurality of different versions of the signal each having clock information used by the radiotelephone for detection of data. The radiotelephone receives a first and second version of the plurality of different versions of the signal and a diversity receiver. The diversity receiver filters the first and second versions of the signal to produce a first filtered signal and a second filtered signal selects one of the first or second filtered signals and utilizes the clock information from the selected signal for detection of data.

BRIEF DESCRIPTION OF THE DRAWINGS

FIG. 4 generally depicts timing aspects related to diversity receiver 200, and more specifically FIG. 4-1 depicts the signalling format of uplink timeslots, FIG. 4-2 depicts the signalling format of downlink timeslots, FIG. 4-3 depicts a typical example of power of Branch A samples 307 over the duration of a timeslot, and FIG. 4-4 depicts a typical example of power of Branch B samples 317 over the duration of a timeslot.

DETAILED DESCRIPTION OF A PREFERRED EMBODIMENT

Figure 1:
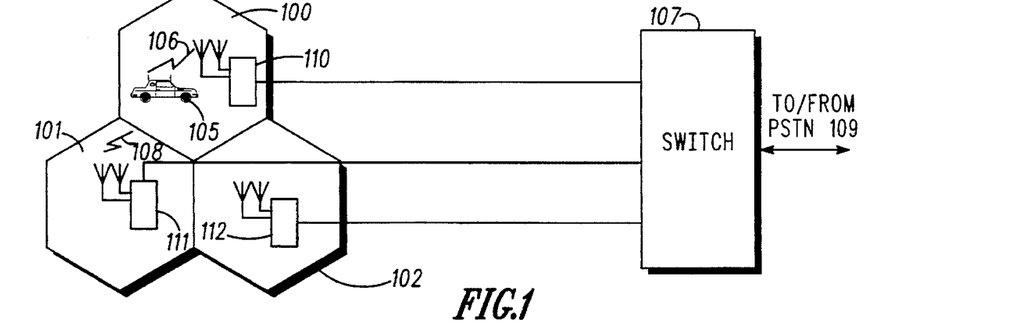
FIG. 1 generally depicts a cellular radiotelephone system.

FIG. 1 generally depicts a communication system which may beneficially employ the present invention. In the preferred embodiment, the communication system is a cellular radiotelephone system. As depicted in FIG. 1, the cellular radiotelephone system is divided into cells 100–102 each having at approximately the center of the cell a fixed-site base-station 110–112. For ease of illustration, only three cells 100–102 are depicted; in typical cellular radiotelephone systems, any number of cells may be required. Continuing, each base-station 110–112 utilized in the cellular radiotelephone system is connected to a switch 107 which acts as an interface between base-stations 110–112 and the public switched telephone network (PSTN) 109. Also depicted in FIG. 1 is a subscriber unit 105 shown within cell 100. In the preferred embodiment, the subscriber unit 105 may be, inter alia, a mobile subscriber unit (i.e., located in an automobile) or a hand-held portable subscriber unit (i.e., carried with an individual). The subscriber unit 105 communicates to a single base-station at a time, for example, base-station 110, but is "handed-off" to neighboring base-stations which serve the particular cell that the subscriber unit 105 is located within. Both the base-stations 110–112 and the subscriber unit 105 are radiotelephones, and as such may employ the diversity receiver in accordance with the invention. In addition, base-stations 110–112 and subscriber unit 105 are able to act as a source to transmit signals to one-another.

Figure 2:
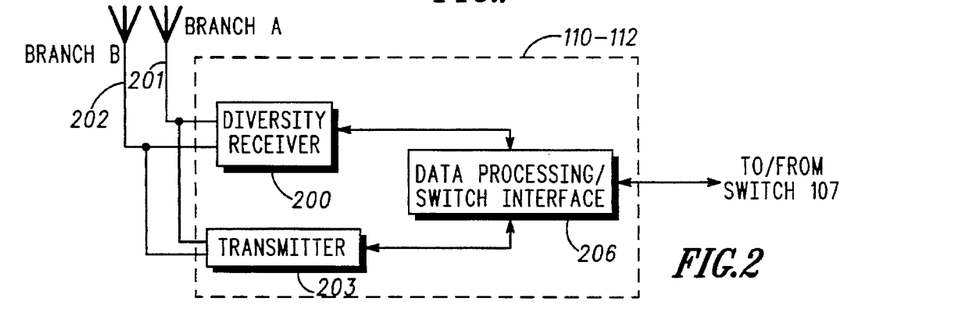
FIG. 2 generally depicts in block diagram form base-stations 110–112 of FIG. 1 which may beneficially employ the present invention.

FIG. 2 generally depicts, in block diagram form, base-stations 110–112 which may beneficially employ the present invention. Each of base-stations 110–112 have at least two antennas 201, 202 which each typically receive different versions a signal transmitted from a source, in this case the source being subscriber unit 105. Antennas 201,202 are coupled to a diversity receiver 200 which employs the present invention. Diversity receiver 200 is coupled to a data processing/switch interface block 206 which performs additional data processing as required and provides an interface to switch 107. Also coupled to data processing/switch interface block 206 is a transmitter 203 which, in the preferred embodiment, has outputs also coupled to antennas 201, 202. Transmitter 203 allows base-stations 110–112 to act as a source of transmission of signals to subscriber unit 105. The outputs of transmitter 203 need not be coupled to antennas 201, 202; in fact the outputs from transmitter 203 may be coupled to separate antennas (not shown). Subscriber unit 105, when employing diversity receiver 200 in accordance with the invention, may look very similar to FIG. 2; however, subscriber unit 105 would not require the switch interface portion of data processing/switch interface block 206.

Figure 3:
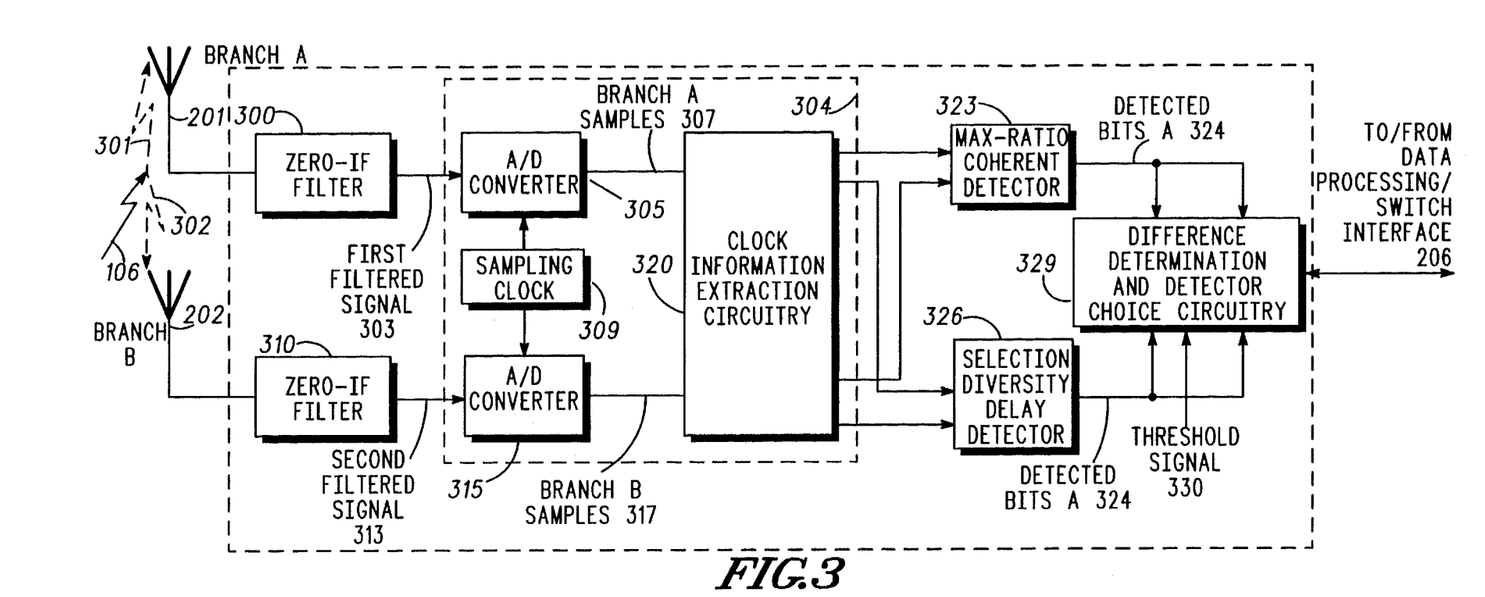
FIG. 3 generally illustrates in block diagram form diversity receiver 200 of FIG. 2 in accordance with the invention.

FIG. 3 generally depicts diversity receiver 200 which may be employed in base-stations 110–112 or subscriber unit 105 in accordance with the invention. Diversity receiver 200 has first and second branches, Branch A and Branch B respectively. A signal 106 transmitted from a source, for example subscriber unit 105, is received by antennas 201 and 202 as first and second versions 301, 302 of signal 106. Each received version 301,302 of signal 106 enters first and second means for filtering, which in the preferred embodiment are zero-IF filters 300, 310. Zero-IF filters 300, 310 perform down-conversion of the received versions 301, 302 from RF directly to base-band frequencies represented by filtered signals 303, 313. Outputs from filters 300,310 enter block 304, which selects which one of filtered signals 303, 313 has the best clock information and utilizes that information for detection of data disposed in both versions 301, 302 of the signal. In the preferred embodiment, block 304 comprises analog-to-digital (A/D) converters 305, 315, sampling clock 309 and clock information extraction circuitry 320. Continuing, outputs from filters 300, 310 are input into analog-to-digital (A/D) converters 305, 315 which convert the corresponding first and second filtered signals 303, 313 into a first plurality of samples, Branch A samples 307 and a second plurality of samples, Branch B samples 317. Converters 305,315 are driven via related sampling clocks, which in the preferred embodiment is a single, common sampling clock 309. Use of sampling clock 309 ensures elimination of A/D conversion errors due to mis-matched sampling clocks.

Branch A samples 307 and Branch B samples 317 enter clock information extraction circuitry 320 which extracts clock information contained in Branch A samples 307 and Branch B samples 317. In the preferred embodiment, outputs from clock information extraction circuitry 320 for each branch are input into both a max-ratio coherent detector 323 and a selection diversity delay detector 326. In alternate embodiments, the outputs may enter only one type of detector, the choice of detector being dependent on system requirements. Also in alternate embodiments, only a single branch receiver may have outputs entering both detectors 323, 326. Continuing, the clock information extracted from samples 307, 317 is used by each detector 323, 326 for data detection. Output from max-ratio coherent detector 323 and selection diversity delay detector 326 are detected bits 324 and 327. These detected bits 324, 327 are input into difference determination and detector choice circuitry 329, as is a threshold signal 330. Difference determination and detector choice circuitry 329 is coupled to data processing/switch interface block 206 which performs additional data processing and interfaces to switch 107 for output to PSTN 109.

Figure 41:
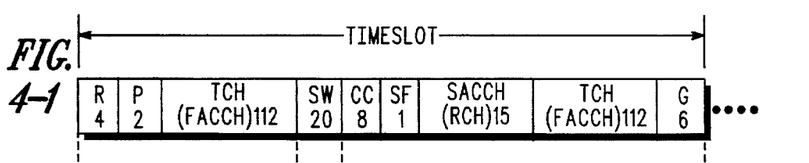
Figure 42:
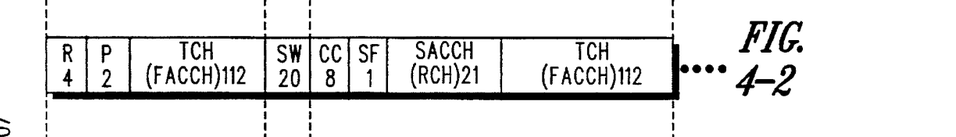

FIG. 4 generally depicts timing aspects related to diversity receiver 200. In the preferred embodiment, the communication system is a time-division multiple access (TDMA) communication system. In alternate embodiments, diversity receiver 200 in accordance with the invention may be beneficially employed in a code-division multiple access (CDMA) communication system as well. In fact, any communication system which transmits signals having, inter alia, clock information and data may beneficially employ diversity receiver 200 in accordance with the invention. Continuing, the content of signal 106 is defined in the standard for the TDMA based Japan Digital Cellular (JDC) system, DIGITAL CELLULAR TELECOMMUNICATION SYSTEM, Research & Development Center for Radio Systems (RCR), RCR Standard-27, Ver. April 1991 on page 9. The signalling format (bit assignment) contained within one timeslot of signal 106 is represented specifically by FIG. 4-1. FIG. 4-1 represents the uplink signal transmission since signal is a transmission from subscriber unit 105 to diversity receiver 200 employed in base-stations 110–112. For applications when the diversity receiver 200 is employed in the subscriber unit 105, a base-station 110–112 will transmit a downlink signal with the signalling format (bit assignment) for one timeslot depicted in FIG. 4-2. The abbreviations as depicted in FIG. 4-1 and FIG. 4-2 are defined below:

| | |
|---|---|
| G | Guard bit |
| R | Guard time for burst transient response (ramp time) |
| P | Preamble |
| SW | Synchronization word (pattern) |
| CC | Color code |
| SACCH | Slow ACCH |
| FACCH | Fast ACCH |
| RCH | Housekeeping bit |
| SF | Steal flag |

Figure 43:
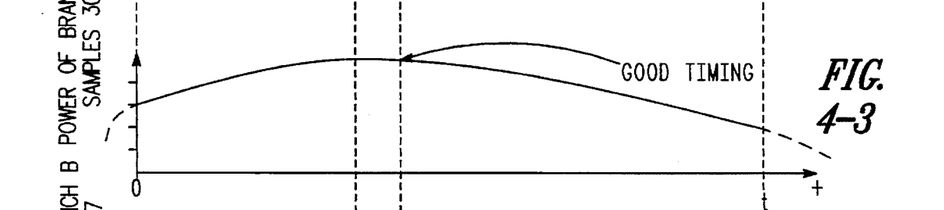
Figure 44:
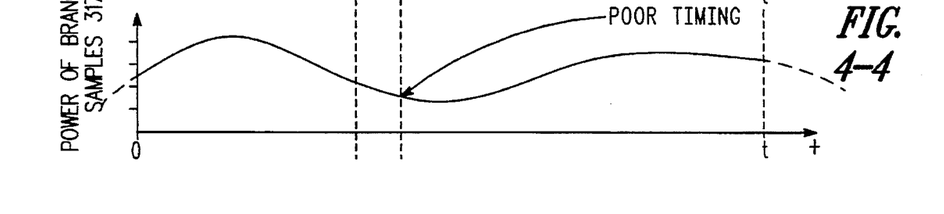

Continuing, in either of the two situations, the method of clock recovery in the diversity receiver 200 will be the same. As shown in FIGS. 4-3 and 4-4, there is depicted the power of Branch A samples 307 and the power of Branch B samples 317 respectively. Both FIGS. 4-3 and 4-4 represent a base-band power envelope (due to fading) of the corresponding branch samples after filtering by zero-IF filters 300, 310. As shown, the modulation envelope of the two power signals has been averaged out. Important to note is that the timeslot depicted in FIGS. 4-3 and 4-4 from 0 (zero) to τ will be aligned, in time, due to the use of a common sampling clock 309. In this manner, a direct comparison between Branch A sample 307 power and Branch B sample 317 power can be employed. Continuing, as depicted in FIG. 4-3, the power in Branch A samples 307 during a common portion, the time of synchronization pattern 400 or 401 (depending on if transmission is uplink or downlink), indicates a high power level, and consequently a strong signal to extract timing from. On the other hand, the power in Branch B samples 317 during the time of synchronization pattern 400 or 401 indicates low power, and thus a poor signal to extract clock information from.

Figure 5:
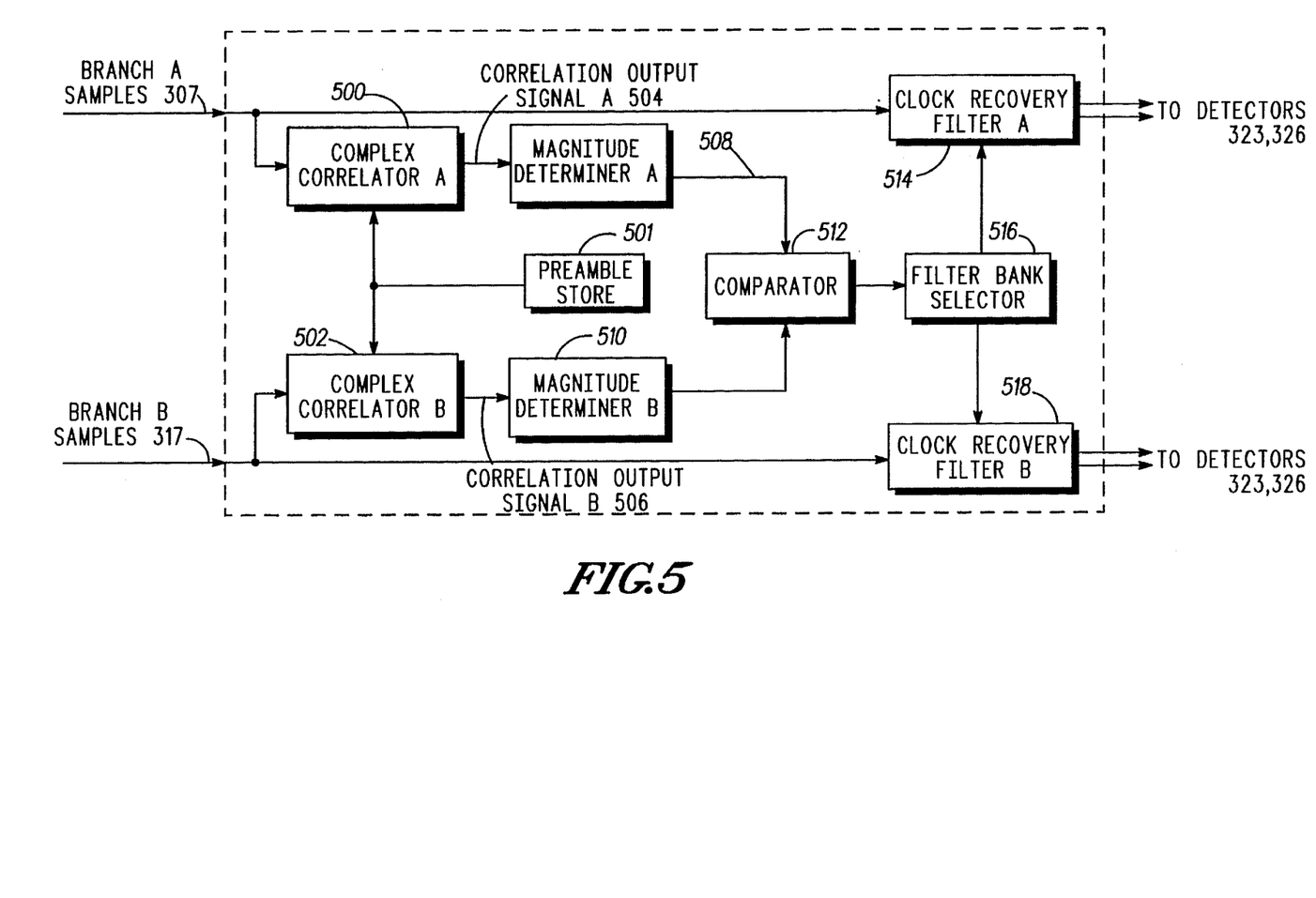
FIG. 5 generally illustrates in block diagram form clock information extraction circuitry 320 employed in diversity receiver 200 in accordance with the invention.

FIG. 5 generally depicts in block diagram form clock information extraction circuitry 320 in accordance with the invention. Input into clock information extraction circuitry 320 are Branch A samples 307 and Branch B samples 317 having corresponding powers given by FIGS. 4-3 and 4-4. Referring to FIG. 5, Branch A samples 307 enter complex correlator A 500 while Branch B samples 317 enter complex correlator B 502. Each complex correlator 500, 502 correlate a predetermined portion of their respective input samples 307, 317 with like synchronization patterns, which in the preferred embodiment is a preamble retrieved from preamble store 501. Correlation within each branch is as follows. The different versions 301, 302 present in Branch A and Branch B respectively can be described as:

$$V_A(t) = a_A(t)e^{j\Phi_A(t)} + n_A(t) \quad (1)$$

$$V_B(t) = a_B(t)e^{j\Phi_B(t)} + n_B(t) \quad (2)$$

where $a_A(t)$ and $a_B(t)$ are envelopes from pre-modulation filtering and Rayleigh fading. These versions, after sampling, enter complex correlator A 500 and complex correlator B 502 where the correlator process is defined as:

$$c_A(t) = (V_A(t) \otimes S^*(-t) = a_A(e^{j\Phi^A}(t \otimes S(-t)) \quad (3)$$

$$c_B(t) = (V_B(t) \otimes S^*(-t) = a_B(e^{j\Phi^B}(t \otimes S(-t)) \quad (4)$$

$$\otimes = \text{convolution}$$

where S(t) is the synchronization pattern 400 or 401 and $c_A$ and $c_B$ represent correlation output signal A 504 and correlation output signal B 506 respectively. Also, $a_A(t)$ and $a_B(t)$ can be assumed to be constant over the synchronization word 400 or 401. Correlation output signal A 504 ($c_A$) and correlation output signal B 506 ($c_B$) then enter magnitude determiner A 508 and magnitude determiner B 510. Determiners 508, 510 determine the magnitude of the correlation output signal 504, 506, which again are related to the branch sample powers depicted in FIGS. 4-3 and 4-4. Output from determiners 508, 510 are input into comparator 512 which, in the preferred embodiment, compares the peaks of the determined magnitudes of each correlation output signal 504, 506 and the greater of the two is determined to be the better indicator of good synchronization and clock recovery. It is this recovered clock which is used in data detection in both branches. In alternate embodiments, other signal quality measures may be used to determine the optimum branch for clock recovery/extraction.

Output from comparator 512 enters filter bank selector 516 which has outputs entering clock recovery filter A 514 and clock recovery filter B 518. Clock recovery filters 514, 518 also have as input Branch A samples 307 and Branch B samples 317. Filters 514, 518 act as matched filters, where the coefficients of the filter are generated by filter bank selector 516. Depending on the output of comparator 512, filter bank selector 516 selects one of eight possible banks based on which bank yields a maximum output from filter bank selector 516. For each branch of diversity receiver 200, the bank is found which generates the peak of correlation output signals 504, 506. The comparator 512 determines which branch, and therefore which bank, should be used for clock recovery. Clock recovery filters 514, 518 then perform clock information extraction of the branch samples 307, 317. At this point, filters 514, 518 have extracted the clock information from the best branch based on the magnitude of the correlation output signals 504, 506, which information is ready to be used in detection of the data contained in branch samples 307, 317.

Figure 6:
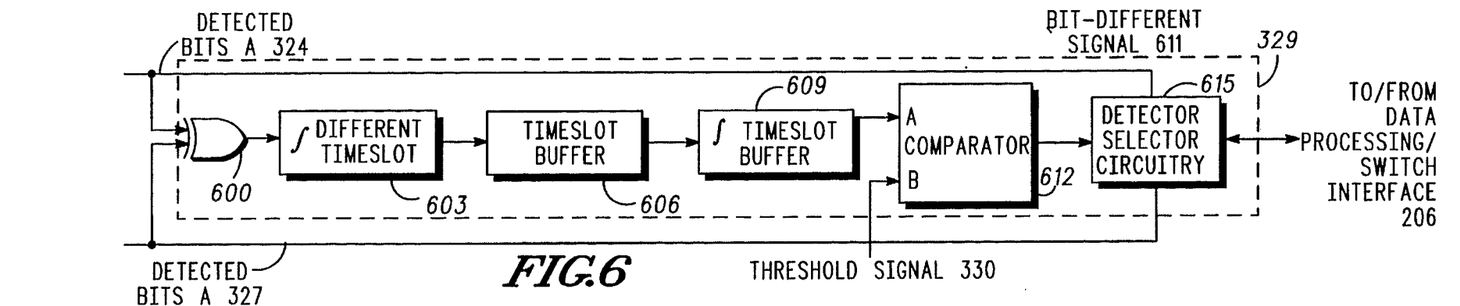
FIG. 6 generally illustrates in block diagram form difference determination and detector choice circuitry 329 employed in diversity receiver 200 in accordance with the invention.

As previously stated, max-ratio coherent detector 323 offers performance improvements over selection diversity delay detector 326 at low RF signal levels. For this reason, diversity receiver 200 employs difference determination and detector choice circuitry 329. FIG. 6 generally depicts determination and choice circuitry 329 in accordance with the invention. From FIG. 3, detected bits A 324 and detected bits B 327 are input into an exclusive OR (XOR) gate 600 which is used to detect the bit-by-bit difference between detected bits A 324 and B 327. XOR 600 detects the number of bits that are different between the two detector outputs for the entire 280-bit length of timeslots 402,403. Output from XOR 600 is input into block 603 which sums the differences on a per-timeslot basis. The total summed difference from block 603 is input into timeslot buffer 606, which is used to temporarily store the summed differences over a timeslot 402, 403. Block 609 sums the total number of differences over a predetermined number of timeslots, which in the preferred embodiment is 128 timeslots. In alternate embodiments, the total number of timeslots to be summed over may change based on system requirements. Continuing, output from block 609 is bit-difference signal 611 which represents the total number of bits that are different, summed over the 280-bit timeslot for 128 timeslots (i.e., the total number of bits =35,840), between max-ratio coherent detector 323 and selection diversity delay detector 326.

At this point, it is instructive to understand the significance of bit-difference signal 611. If the total number of bit-differences over the last 128 timeslots is zero, it can be assumed that both max-ratio coherent detector 323 and selection diversity delay detector 326 are receiving a sufficiently strong signal and detecting bits exactly like one another. However, as RF signal levels begin to decrease, the number of errors represented by bit-difference signal 611 would be expected to increase since the performance of selection diversity delay detector 326 begins to degrade at lower RF signal levels. At some point, if it is assumed that selection diversity delay detector 326 is utilized for sufficiently strong RF signal levels, max-ratio coherent detector 323 will be the optimum detector for lower RF signal levels since the average BER vs. RF signal level curves for detected bits 324, 327 "crossover" at approximately −95 dBm input level in the preferred embodiment. In alternate embodiments, like measurement curves other than average BER vs. RF signal level curves for the detected bits exiting the chosen detectors may be utilized; however, the detected bits output from the chosen detectors must present a crossover point with respect to the measurement curves to be utilized.

To make the transition between detectors 323, 326, a threshold signal 330 is also input into comparator 612, the threshold signal representing 6 (six) bit-differences in the preferred embodiment. Consequently, when bit-difference signal 611 represents less than or equal to 6-bit differences over the total 35,840 bits (strong RF signal levels), comparator 612 outputs a control signal to detector selection circuitry 615 to choose detected bits B 327 which are output from selection diversity delay detector 326. On the other hand, when bit-difference signal 611 represents greater than 6-bit differences over the total 35,840 bits (weaker RF signal levels), comparator 612 will send a different control signal to detector selection circuitry 615 to choose detected bits A 324 being output from max-ratio coherent detector 323. In this way, difference determination and detector choice circuitry 329 "switches over" between the two detectors 323, 326 depending on the number of bit-differences determined over a predetermined time period (128 timeslots). In this way, performance of diversity receiver 200 is optimized over a particular expected RF signal level range.

Figure 7:
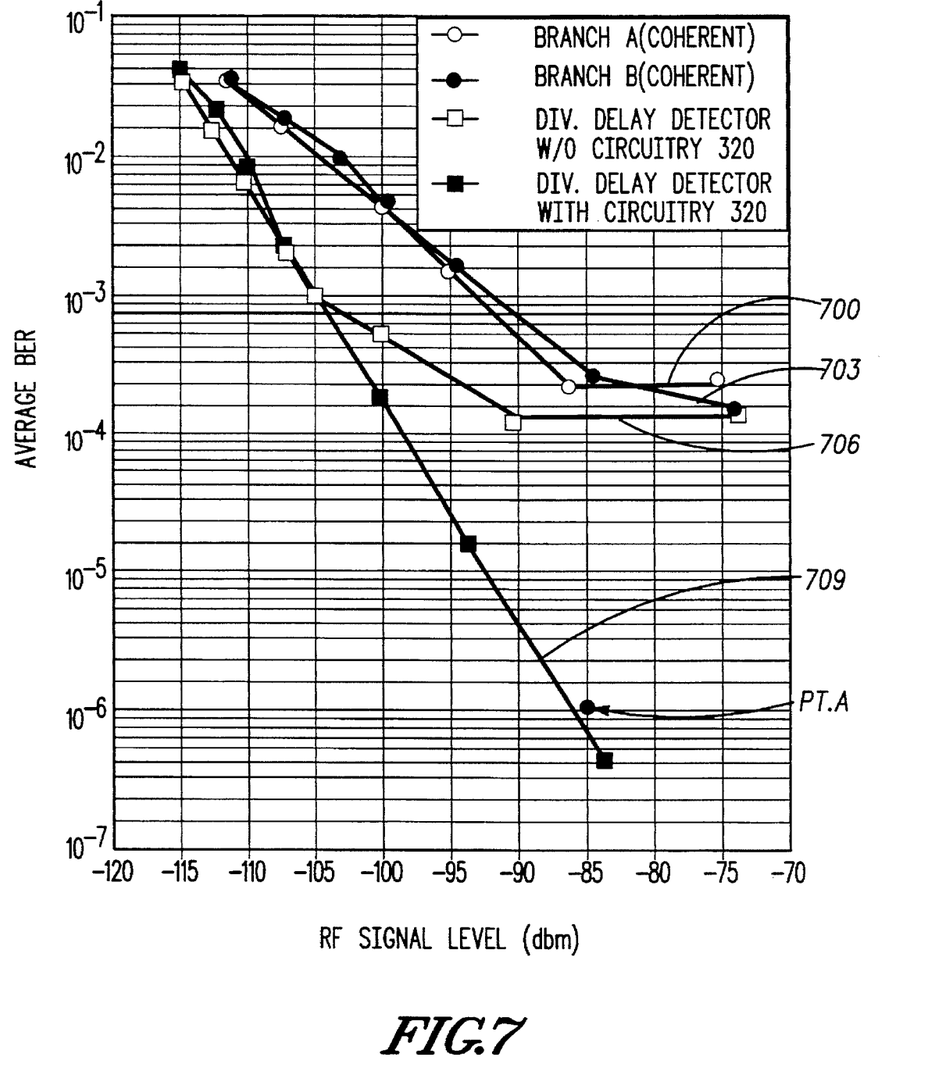
FIG. 7 generally depicts a measurement of average BER vs. RF signal level for diversity receiver 200 with and without clock information extraction circuitry 320.

Performance of diversity receiver 200 employing clock information extraction circuitry 320 in accordance with the invention is generally depicted in FIG. 7. FIG. 7 depicts a measurement of average BER vs. RF signal level (in dBm) for diversity receiver 200 with and without clock information extraction circuitry 320. Curves 700, 703 represent single branch coherent detection in Branch A and Branch B respectively. Curve 706 represents an average BER versus RF signal level for a diversity delay detector which is not preceded by clock information extraction circuitry 320. In fact, curve 706 represents a case where clock information is extracted from each branch separately, and the extracted clock information from each branch is used in a detector similar to selection diversity delay detector 326. As can be seen, the best average BER that can be obtained for RF signal levels above −90 dBm is approximately $1 \times 10^{-4}$. Obviously, this falls well below the desired point of operation of $1 \times 10^{-6}$ at −85 dBm, point A in FIG. 7. However, when clock information extraction circuitry 320 precedes a detector similar to detector 323, significant improvement is seen. In fact, the rigid specification of $1 \times 10^{-6}$ at −85 dBm is exceeded for curve 709, where the average BER is approximately $5 \times 10^{-6}$ at −85 dBm RF signal level. Thus, the employment of clock information circuitry 320 to extract clock information from the branch with the greatest correlation magnitude peak shows a vast performance improvement in diversity receiver 200.

Figure 8:
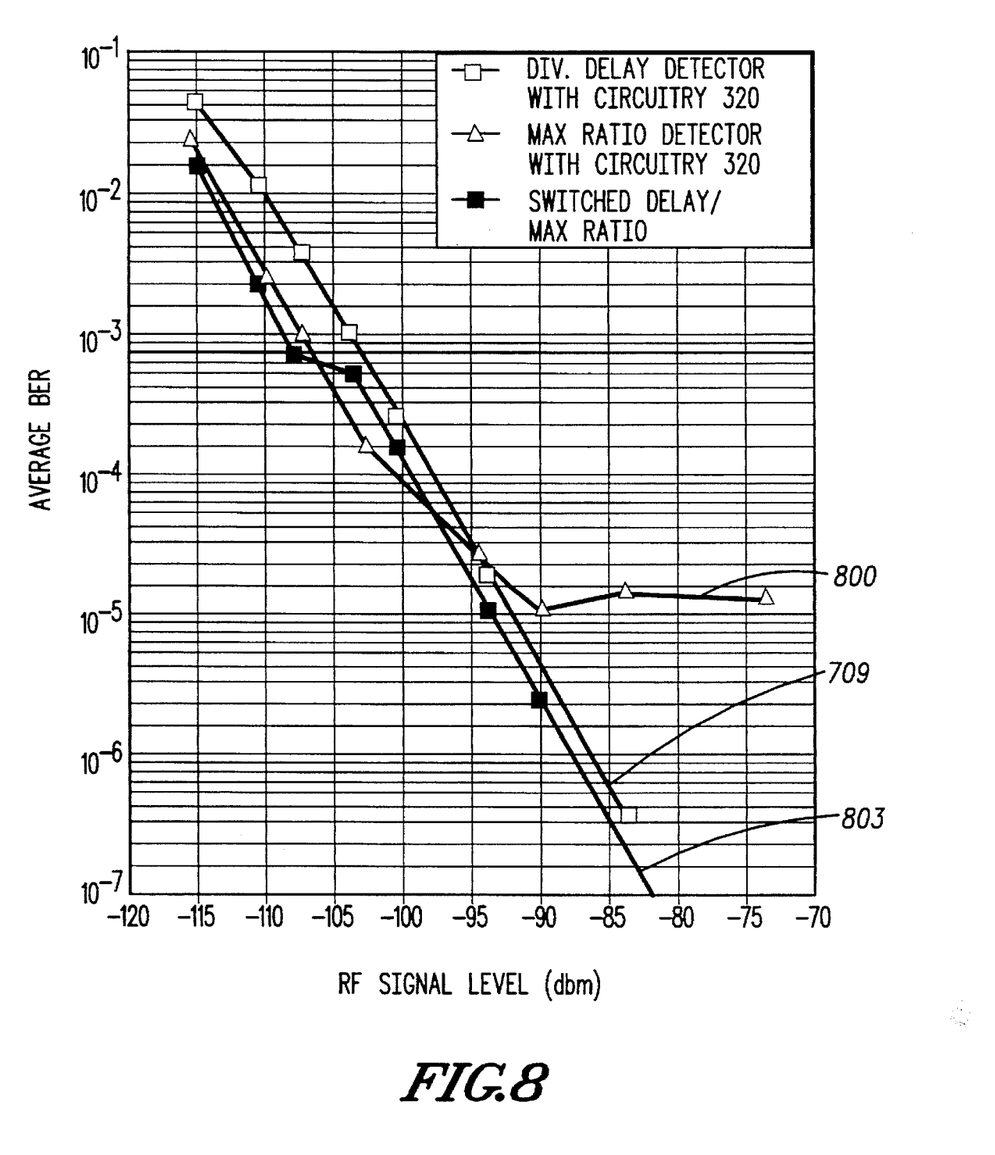
FIG. 8 generally depicts a measurement of average BER vs. RF signal level for diversity receiver 200 with and without employment of difference determination and detector choice circuitry 329.

FIG. 8 depicts a measurement of diversity receiver 200 employing difference determination and detector choice circuitry 329 in accordance with the invention. Again, average BER is measured versus RF signal level (in dBm). Curve 709 is replicated from FIG. 7 and depicts average BER versus RF signal level for selection diversity delay detector 326 used in conjunction with clock information extraction circuitry 320. Curve 800 represents average BER versus RF signal level output from max-ratio coherent detector 323 when used in conjunction with clock information extraction circuitry 320. As can be seen, at approximately −95 dBm, curve 709 and curve 800 intersect, and would thus yield zero bit-differences entering comparator 612. As the RF signal level decreases, the number of bit-differences determined by determination and choice circuitry 329 will increase until the threshold of 6 bit-differences is reached. At this RF signal level (approximately −105 dBm on FIG. 8), difference determination and choice circuitry 329 "switches over" to max-ratio coherent detector 323. Curve 803 depicts the resulting output of the switched selection diversity delay detector 326/max-ratio coherent detector 323. In ideal measurement environments, curve 803 would track curve 709 for bit-differences less than or equal to the threshold and would track curve 800 for bit-differences greater than the threshold. The measurement difference between curves 709 and 800 with respect to curve 803 can be attributed to measurement error in the testing setup. Thus, by employing difference determination and detector choice circuitry 329, the rigid standard of $1 \times 10^{-6}$ at −85 dBm is met while also maintaining improved BER at lower RF power levels.

What I claim is:

1. A radiotelephone receiving a plurality of different versions of a signal transmitted from a source, the plurality of different versions of the signal each having clock information used by the radiotelephone for detection of data, the radiotelephone comprising:

first and second antenna means for receiving a first and second version of the plurality of different versions of the signal; and a diversity receiver comprising:

first and second means, coupled respectively to said first and second antenna means, for filtering said first and second version of the signal to produce a first filtered signal and second filtered signal; and means for detecting data from said first and second filtered signals, said means for detecting data comprising, means for extracting the clock information from said first and second filtered signals and for selecting the clock information from one of the first and second filtered signals, based upon which of said first or second filtered versions of the signal is least corrupted during a common portion, and means for selecting one of said first or second filtered signals and utilizing the selected clock information for detection of data.

2. The radiotelephone of claim 1 wherein said common portion of said first and second filtered signals occurs during a synchronization pattern portion of said first and second filtered signals.

3. The radiotelephone of claim 1 wherein said means detecting data is operable for detecting data in at least two branches of said diversity receiver.

4. A receiver utilized in a radiotelephone, the receiver receiving a signal transmitted from a source, the signal having both clock information and data, the clock information to be used by the receiver for detection of the data, the receiver comprising:

means for filtering the received signal;

mean, coupled to said means for filtering, for converting said filtered received signal into a plurality of samples, including both the clock information and data;

means, coupled to said means for converting, for extracting the clock information from said plurality of samples;

at least a first, max-ratio coherent, data detector and a second, selection diversity delay, data detector for detecting the data contained in said plurality of samples utilizing said extracted clock information; and means, coupled to said at least first and second data detectors, for determining a difference in said detected data between said at least first and second data detectors and choosing said detected data from said first data detector or said second date detector when said difference is less than or equal to a predetermined threshold.

5. The receiver of claim 4 wherein said means for determining and choosing further comprises:

means for summing the differences in said detected data between said at least first and second data detection means over a predetermined time period;

means, coupled to said means for summing, for comparing the summed differences with a predetermined threshold; and means, coupled to said means for comparing, for selecting the detected data from said second data detector when said summed differences is less than or equal to the predetermined threshold.

6. The receiver of claim 4 wherein said means for determining a difference is said detected data further comprises means for determining a difference in said detected data on a bit-by-bit basis.

7. The receiver of claim 6 wherein said predetermined threshold is at least two (2) bit-differences.

8. The receiver of claim 6 where the data from said first data detector comprises a first plurality of detected bits and the detected from said second data detector comprises a second plurality of detected bits, and the first plurality of data bits and the second plurality of data bits present a crossover point with respect to like measurement curves for the first and second plurality of data bits.

9. The receiver of claim 8 wherein the first plurality of data bits and the second plurality of data bits present a crossover point with respect to average bit error rate (BER) versus radio frequency (RF) signal level curves for the first and second plurality of data bits.

10. A diversity receiver employed in a radiotelephone, the diversity receiver having first and second branches each receiving first and second versions of a signal transmitted from a source, the versions each having clock information to be used by the diversity receiver for detection of data, the diversity receiver comprising:

first and second means for filtering the first and second received versions of the transmitted signal;

first and second means, coupled, respectively to said first and second means for filtering, for converting said first and second demodulated signals into a first plurality of samples and a second plurality of samples via related sampling clocks;

means for extracting the clock information from one of said first and second plurality of samples for detection of data in both first and second branches, said means for extracting comprising: means for correlating a portion of said first plurality of samples and correlating a portion of said second plurality of samples with like synchronization patterns to produce a first correlation output signal and a second correlation output signal, means for comparing a magnitude of said first correlation output signal and a magnitude of said second correlation output signal, and means for utilizing the clock information contained in one of either said first plurality of samples or said second plurality of samples for data detection in said first and second branches, based upon which of the first and second correlation output signals is greatest in magnitude;

at least first and second data detection means, couple to said means for extracting, for detecting data contained in said first plurality and said second plurality of samples utilizing said extracted clock information; and means, coupled to said at least first and second data detection means, for determining the difference in said detected data between said at least first and second data detection means and choosing said first data detection means or said second data detection means when the difference is less than or equal to a predetermined threshold.

11. The diversity receiver of claim 10 wherein said first data detection means is a max-ratio coherent detector and said second data detection means is a selection diversity delay detector.

12. A radiotelephone receiving a plurality of different versions of a signal transmitted from a source, the plurality of different versions of the signal each having clock information used by the radiotelephone for detection of data, the radiotelephone having first and second antenna means for receiving a first and second version of the plurality of different versions of the signal, and a diversity receiver comprising:

first and second means, coupled respectively to said first and second antenna means, for filtering said first and second versions of the signal to produce a first filtered signal and a second filtered signal; and means for detecting data from said first and second filtered signals, said means for detecting data comprising, means for extracting the clock information from said first and second filtered signals and for selecting the clock information from the first and second filtered signals based upon which of the first and second filtered signals is least corrupted during a common portion, and means for selecting one of said first or second filtered signals and utilizing the selected clock information for detection of said data.

13. The radiotelephone of claim 12 wherein said plurality of different versions of a signal comprise a plurality of different versions of time division multiple access (TDMA) signals.

14. The radiotelephone of claim 12 wherein said plurality of different versions of a signal comprise a plurality of different versions of code division multiple access (CDMA) signals.

15. A method of clock recovery in a diversity receiver, the diversity receiver receiving a plurality of different versions of a transmitted signal containing clock information, the clock information used by the diversity receiver for data detection, the method comprising the steps of:

converting at least two of the plurality of different received versions into a first plurality of samples and a second plurality of samples via related sampling clocks;

correlating a predetermined portion of said first plurality of samples and said second plurality of samples with like synchronization patterns to produce a first correlation output signal and a second correlation output signal;

comparing said first correlation output signal and said second correlation output signal; and utilizing the clock information contained in one of the at least two received versions, based upon which of the received versions is least corrupted during a common portion, for data detection in at least two branches of said diversity receiver.

16. A receiver utilized in a radiotelephone, the receiver receiving a signal transmitted from a source, the signal having both clock information and data, the clock information to be used by the receiver for detection of the data, the receiver comprising:

means for filtering the received signal;

means, coupled to said means for filtering, for converting said filtered received signal into a plurality of samples, including both the clock information and data;

means, coupled to said means for converting, for extracting the clock information from said plurality of samples for detection of the data;

at least first and second data detection means, coupled to said means for extracting, for detecting data contained in said plurality of samples utilizing an extracted clock information from one of said plurality of samples based upon which of the plurality of samples is least corrupted during a common portion; and means, coupled to said at least first and second data detection means, for determining a difference in said detected data between said at least first and second data detection means and choosing said detected data from said first data detection means or said second data detection means when said differences is less than or equal to a predetermined threshold.

17. The receiver of claim 16 wherein the means for filtering the received signal comprises first and second means for filtering a first and second received version of the received signal.

18. The receiver of claim 16 wherein the means for converting comprises means for converting said filtered received signal into a first plurality of samples and a second plurality of samples via related sampling clocks.

19. The receiver of claim 16 wherein said common portion of said samples occurs during a synchronization pattern portion of said samples.

* * * * *